Nov. 22, 1938.  E. V. BERGSTROM  2,137,523
HEAT TREATING PRESSURE VESSELS
Filed Nov. 23, 1936
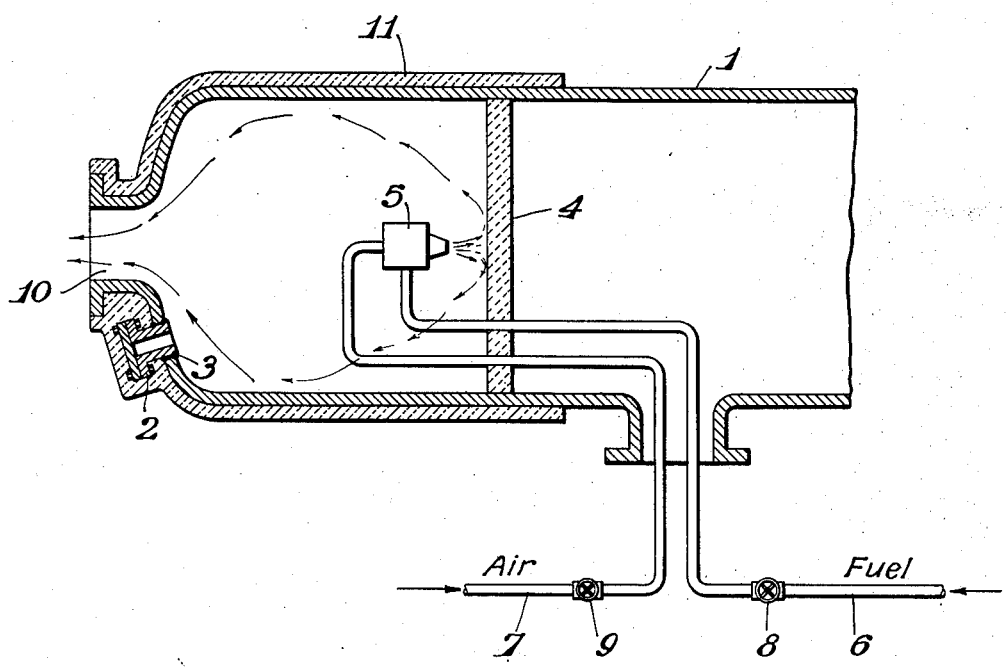
INVENTOR
Eric V. Bergstrom
BY Lyle S. Motley
ATTORNEY Patented Nov. 22, 1938

2,137,523

UNITED STATES PATENT OFFICE 2,137,523

HEAT TREATING PRESSURE VESSELS

Eric V. Bergstrom, Chicago, Ill., assignor to Standard Oil Company, Chicago, Ill., a corporation of Indiana Application November 23, 1936, Serial No. 112,440

3 Claims. (Cl. 148—13)

The present invention relates to a new technique in heat treating of vessels, and apparatus for carrying out this technique.

It is an object of the present invention to provide an improved method of heat treating vessels incident to fabricating operations, such for example as welding.

It is another object of the present invention to provide a novel combination of apparatus for heat treating a vessel.

Other objects of the present invention will be apparent from the following description and claims. The invention will be best understood by referring to the accompanying drawing wherein I have indicated a vessel to be heat treated in accordance with my new method.

In operations wherein pressure vessels are employed defects often appear after installation and use. These defects evidence themselves in the form of leaks. The usual practice is to correct these defects by welding, such for example as electrical welding or any of the forms of welding well known to the art. It is also often found necessary to fabricate additions to such vessels and to add nozzles, manways, et cetera. This likewise is accomplished by welding operations. These welding operations result in setting up in the vessel structure, in and about the welded portions, certain irregular stresses. In order to insure safety, economical operation and maximum life of the welded structures, particularly in heavy pressure vessels, it is necessary to remove or normalize these stresses. The technique now employed involves heat treating the vessel subsequent to the welding or fabricating operations. A large percentage of these fabricating and welding operations must necessarily take place in the field where equipment for carrying out the necessary heat treating is limited. Known methods have usually involved some form of external heating, for example, as by inserting the desired section of the vessel in a furnace; often no furnace is available for this purpose. The inconvenience and difficulty of this method of heat treating, particularly in the field, is readily apparent, even where a furnace is available.

I have shown a vessel 1 which has been subjected to certain fabricating operations such for example as the insertion of a nozzle 2 with an accompanying welding operation at 3.

In carrying out my new method I provide a baffle wall 4 arranged on the inside of the vessel 1 to shut off the particular portion to be treated from the remaining portion thereof. This wall may be constructed of any well known material having the necessary heat-resisting and non-conducting characteristics—such for example as asbestos or fire brick.

I have provided for the burning of fuel within the restricted portion of the vessel, defined by that portion to be treated and the baffle wall. The specific form of means for burning fuel which I have illustrated comprises a burner 5 with connecting lines 6 and 7 for furnishing compresed air and gases thereto. Suitable valve means 8 and 9 are provided for controlling the supply lines 4 and 5. Any well known combination of fuels and burner may be employed. This burner is located near the center of the baffle wall and in such a position as to direct the flame against the heat resisting baffle wall 4. The combustion gases may be exhausted through any convenient opening 10 in the portion of the vessel being treated.

I provide the particular portion of the vessel to be treated with insulating material 11 about the outer surface thereof. This insulating material may be any of the well known materials having the necessary characteristics of non-conduction of heat, such for example as an asbestos composition.

It will be seen that I have provided a technique for heat treating vessels, particularly in the field, which has the advantage of eliminating the necessity for moving the vessel into a furnace. I have provided for concentrating the heat in that portion of the vessel requiring treatment, thus reducing the total amount of heat required and making possible a more intense and effective heat in the zone to be treated. I have provided an arrangement wherein the flame of combustion is directed against the baffle wall rather than directly against any portion of the vessel, thus protecting the vessel wall from direct contact with the flame.

It will be understood that various embodiments of my invention may be used within the scope of the accompanying claims.

I claim:

1. The method of heat treating a vessel which comprises introducing fuel into the vessel to be heat treated and burning the same therein, restricting the hot gases to a particular portion of the vessel, whereby to confine the heat to said particular portion imparting the heat of combusion indirectly to the walls of the restricted portion of the vessel through the inner surface thereof, thus preventing direct contact of the flame with the wall and exhausting the gases of combustion through an opening in said vessel.

2. The method of heat treating a vessel which comprises insulating the exterior of said vessel, burning a fuel therein while preventing direct contact of the flame produced with the wall of said vessel, restricting the resulting combustion gases to a desired portion of said vessel and exhausting said combustion gases through an opening in said vessel.

3. The method of heat treating a vessel which comprises forming a chamber of restricted size by means of a heat-resistant partition therein, insulating the exterior of that portion of said vessel defining said chamber, burning a fuel in said chamber while preventing direct contact of the flame produced with the wall of said vessel, and exhausting the resulting combustion gases from said chamber through an opening in said vessel.

ERIC V. BERGSTROM.